(12) United States Patent
Short

(10) Patent No.: US 11,732,822 B2
(45) Date of Patent: Aug. 22, 2023

(54) MULTI-CONDUIT FLEXIBLE RETENTION MECHANISM

(71) Applicant: Deere & Company, Moline, IL (US)

(72) Inventor: Daniel T. Short, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/660,447

(22) Filed: Apr. 25, 2022

(65) Prior Publication Data
US 2022/0243842 A1 Aug. 4, 2022

Related U.S. Application Data

(63) Continuation of application No. 16/524,848, filed on Jul. 29, 2019, now Pat. No. 11,320,067.

(51) Int. Cl.
| | |
|---|---|
| *F16L 5/00* | (2006.01) |
| *B60R 16/02* | (2006.01) |
| *F16L 3/127* | (2006.01) |
| *H02G 3/04* | (2006.01) |
| *B60R 16/08* | (2006.01) |

(52) U.S. Cl.
CPC ............... *F16L 5/00* (2013.01); *F16L 3/127* (2013.01); *H02G 3/0456* (2013.01); *B60R 16/0222* (2013.01); *B60R 16/08* (2013.01)

(58) Field of Classification Search
USPC .................................................. 248/56, 57
See application file for complete search history.

(56) References Cited

U.S. PATENT DOCUMENTS

| | | | |
|---|---|---|---|
| 4,522,081 A | 6/1985 | Mackin et al. | |
| 4,763,541 A | 8/1988 | Spease | |
| 5,109,458 A | 4/1992 | Dixit et al. | |
| 6,486,400 B1 | 11/2002 | Smutny et al. | |
| 7,388,156 B2 | 6/2008 | Knagge | |
| 7,434,814 B2 | 10/2008 | Kumakura et al. | |
| 10,525,908 B2 | 1/2020 | Cimpean et al. | |
| 11,320,067 B2 * | 5/2022 | Short ................ | F16L 3/127 |

(Continued)

FOREIGN PATENT DOCUMENTS

| | | | | |
|---|---|---|---|---|
| JP | H08140246 A | | 5/1996 | |
| JP | 11263118 A | * | 9/1999 | ......... B60H 1/00521 |
| JP | 2002171645 A | | 6/2002 | |

OTHER PUBLICATIONS

Image of Collapsible Bowls (1 page) (prior art at least as of Jul. 24, 2018).

(Continued)

*Primary Examiner* — Alfred J Wujciak

(57) ABSTRACT

A retention mechanism provided for use with a first line and a second line comprises a flexible convoluted web, a first conduit, and a second conduit. The first conduit defines a first passageway through the web, and is configured to receive the first line through the first passageway. The second conduit defines a second passageway through the web, and is configured to receive the second line through the second passageway. The first and second conduits are attached to and surrounded by the web such that the web enables movement of the first and second lines when the first and second lines are fixed respectively to the first and second conduits and extend respectively through the first and second passageways.

14 Claims, 9 Drawing Sheets

(56) References Cited

U.S. PATENT DOCUMENTS

2003/0098171 A1    5/2003    Sato
2005/0158503 A1    7/2005    O'Connor
2008/0290610 A1   11/2008   Dukes et al.

OTHER PUBLICATIONS

Image of Chassis Unlimited Inc. Twin Stick Shift Boot Kit having flexible rubber shell accompanied by steel bottom plate to mount to floor board (1 page) (http://www.chassisunlimited.com/trail-gear-creepy-twin-stick-shift-boot.html) (2018).

Image of GM Part No. 26093753 Transmission Column Shift Lever Boot (1 page) (prior art at least as of Nov. 21, 2013).

Screenshot from Ozzstar Productions video showing brake caliper piston boot that is attached to and forms seal around axially movable piston blocking ingress of water and debris (1 page)(video published on Jun. 18, 2015, https://www.youtube.com/watch?v=ezYhKfiTcBw).

Images of Daystar Black Universal Firewall Boot (2 pages, https://www.clemson4wheel.com/daystar-black-universal-firewall-boots.html?_sm_au_=iVVV2r4kJrq5sHMF) (prior art at least as of May 9, 2019).

Image of Specter Off-Road, Inc. Universal Fit Firewall Boot for Land Cruiser (1page, https://www.sor.com/CAT184.SOR?_sm_au_=iVVV2r4kJrq5sHMF) (prior art at least as of May 9, 2019).

Design Tek Plastics, "Overmolding" Oct. 26, 2013 (Year: 2013).

\* cited by examiner

MULTI-CONDUIT FLEXIBLE RETENTION MECHANISM

FIELD OF THE DISCLOSURE

The present disclosure relates to a retention mechanism for retaining a line with a convoluted web relative to a support structure.

BACKGROUND OF THE DISCLOSURE

It is common for a line to pass through a support structure in a vehicle, equipment, or other context. The line may be, for example, a fluid line (e.g., hydraulic, pneumatic, water), mechanical cable, electrical wire, or electrical wiring harness.

SUMMARY OF THE DISCLOSURE

According to an aspect of the present disclosure, a retention mechanism is provided for use with a first line and a second line to facilitate their passage through a support structure. The retention mechanism comprises a flexible convoluted web to be mounted to the support structure, a first conduit, and a second conduit. The first conduit defines a first passageway through the web. The first passageway is configured to receive the first line through the first passageway. The first conduit is configured to be fixed to the first line to block passage of contaminants through the first passageway. The second conduit defines a second passageway through the web. The second passageway is configured to receive the second line through the second passageway. The second conduit is configured to be fixed to the second line to block passage of contaminants through the second passageway. The first and second conduits are attached to and surrounded by the web such that the web enables movement of the first and second lines relative to the support structure when the first and second lines are fixed respectively to the first and second conduits and extend respectively through the first and second passageways.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
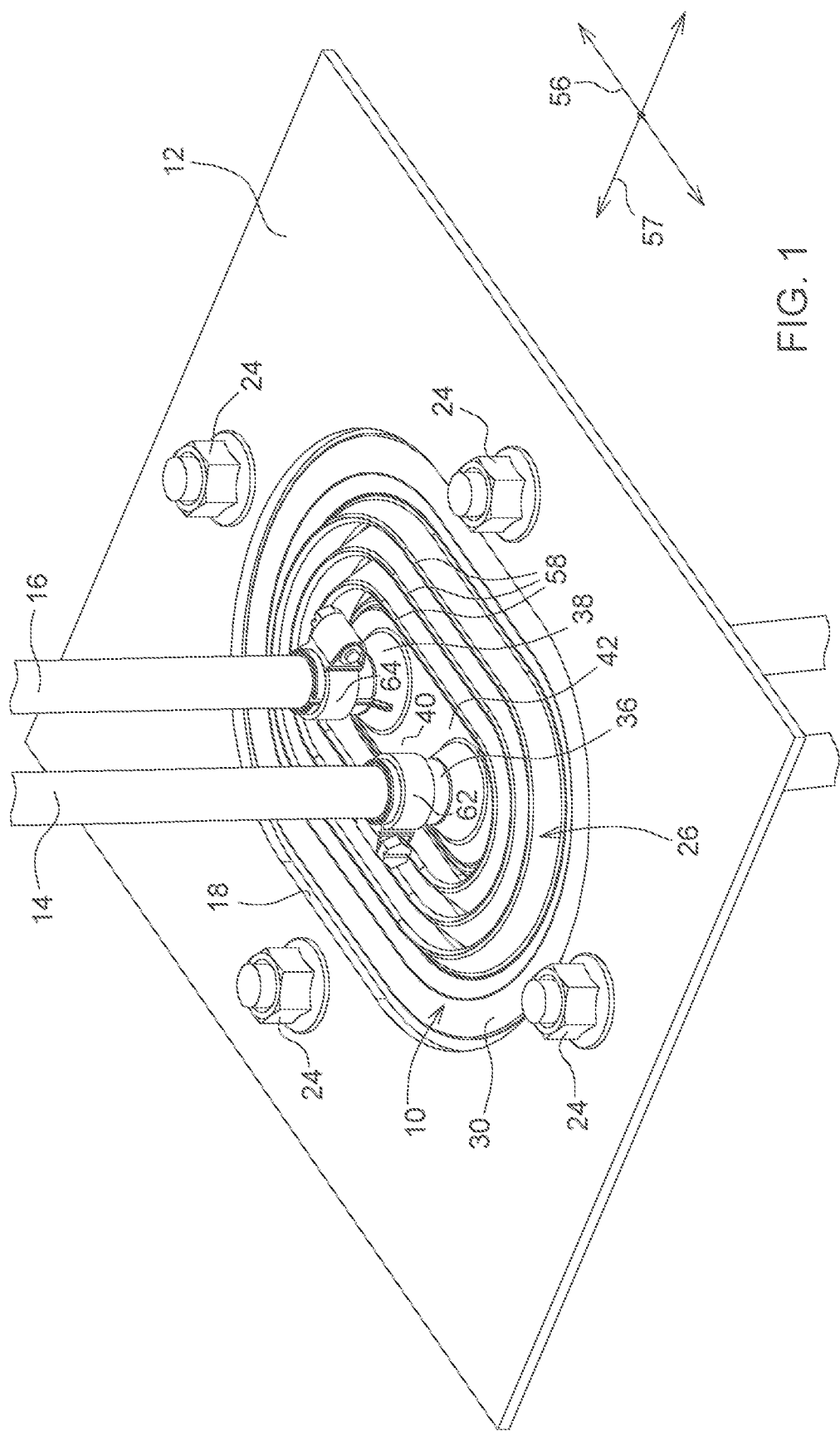
FIG. 1 is a perspective view showing a retention mechanism for retaining a first line and a second line relative to a support structure.

Referring to FIGS. 1-5, there is shown a retention mechanism 10. The retention mechanism 10 retains multiple lines relative to a support structure 12 in a manner that enables movement of the lines relative to the support structure 10, but blocks passage of contaminants through the support structure 10 between the retention mechanism 10 and the lines. The lines may take a wide variety of forms, such as, for example, fluid lines (e.g., hydraulic, pneumatic, water), mechanical cables, electrical wires, and electrical wiring harnesses, to name but a few. The retention mechanism 10 may be configured for use with two or more lines. Illustratively, the retention mechanism 10 is provided for use with a first line 14 and a second line 16, each of which is illustrated, for example, as a hydraulic hose.

The retention mechanism 10 is configured to be mounted to the support structure 12. The support structure 12 may take a wide variety of forms for use in a wide variety of contexts. Illustratively, the support structure 12 includes a panel or other type of wall. The support structure 12 has an aperture 18 in which the retention mechanism 10 is positioned.

The retention mechanism 10 includes a mounting wall 20. The mounting wall 20 has a plurality of fastener-receiving apertures 22 (e.g., four), and the support structure 12 has a plurality of fastener-receiving apertures 23 (e.g., four). A plurality of fasteners 24 (e.g., four) are positioned respectively in the fastener-receiving apertures 22, 23 such that the fasteners 24 attach the mounting wall 20 to the support structure 12. Each fastener 24 may include a threaded bolt, a washer received on the bolt, and a nut threaded onto the bolt (threads not shown for ease of illustration).

The retention mechanism 10 includes a flexible convoluted web 26. The web 26 is positioned in an aperture 28 of the mounting wall 20, and is attached to the mounting wall 20 such that the mounting wall 20 surrounds the web 26. An outer periphery 30 of the web 26 is overmolded onto an inner periphery 32 of the mounting wall 20 defining the aperture 28. The outer periphery 30 may have a U-shaped portion overmolded onto the inner periphery 32 on either side of the inner periphery.

The retention mechanism 10 includes a central portion 34. The central portion 34 includes a first conduit 36, a second conduit 38, and a support wall 40 that may be flat. The first and second conduits 36, 38 are attached to the support wall 40. The conduits 36, 38 extend axially from the support wall 40, and the web 26 extends radially from the support wall 40 to the mounting wall 20. The mounting wall 20 surrounds the first and second conduits 36, 38.

Figure 6:
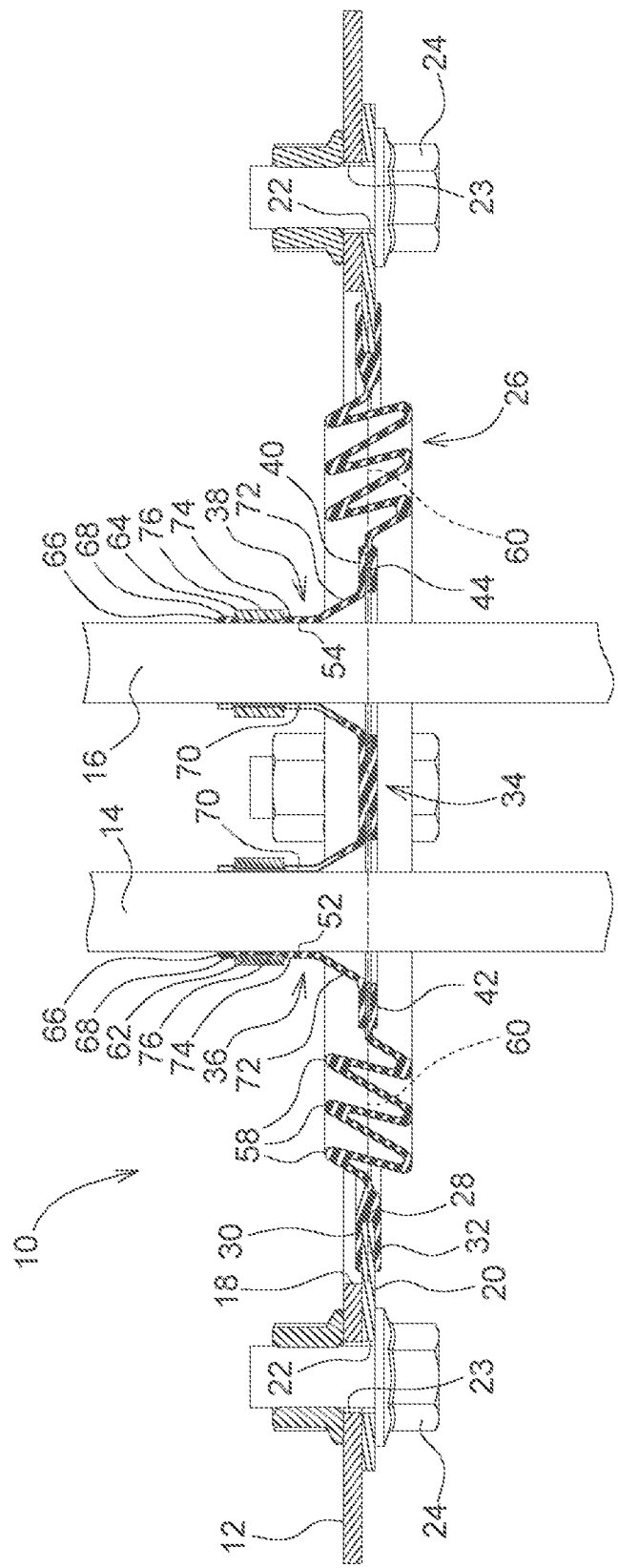
FIG. 6 is a sectional view, taken along lines 6-6 of FIG. 4, showing a stiffener embedded in a pocket.
Figure 7:
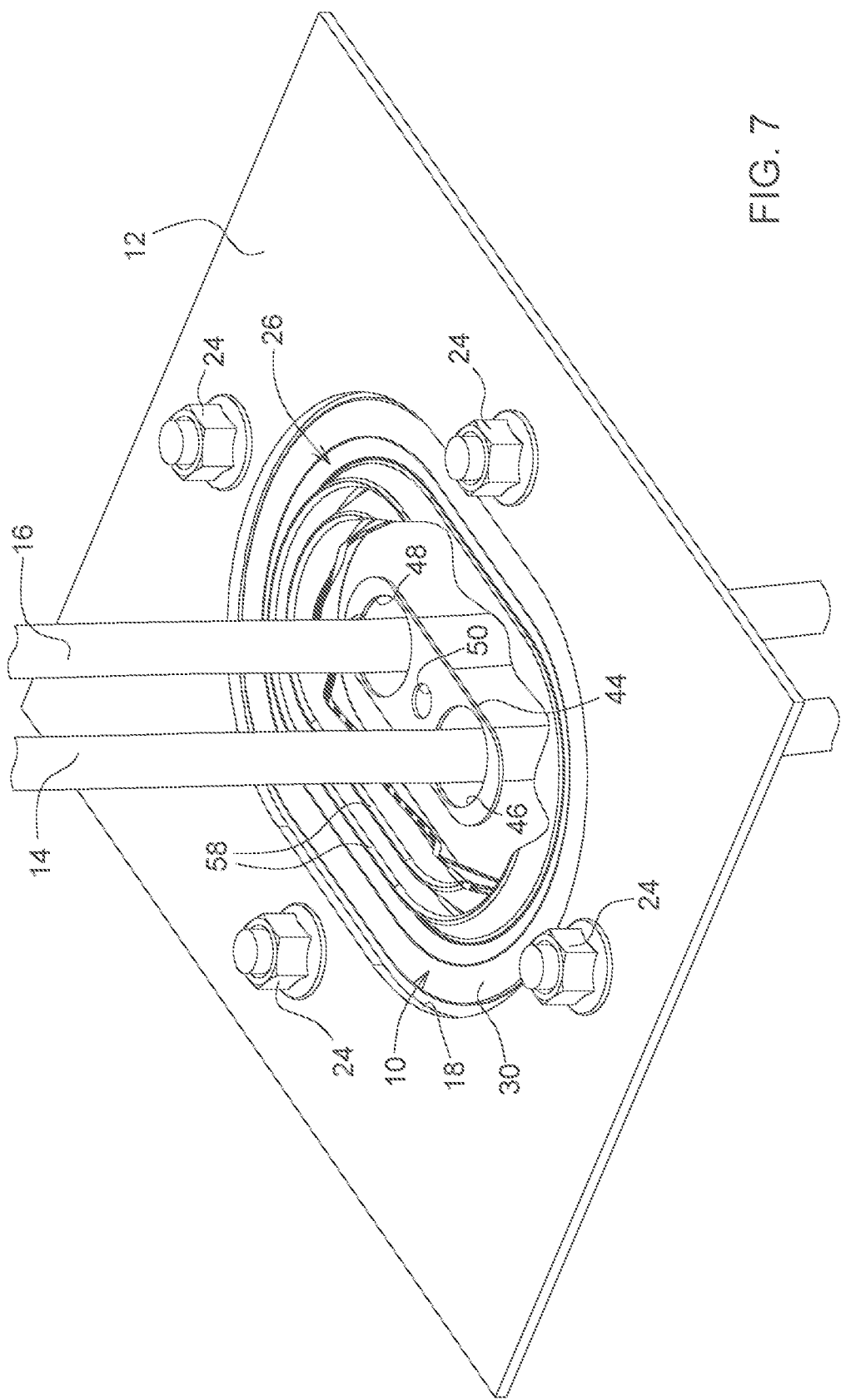
FIG. 7 is a perspective view of a stiffener of the retention mechanism.
Figure 9:
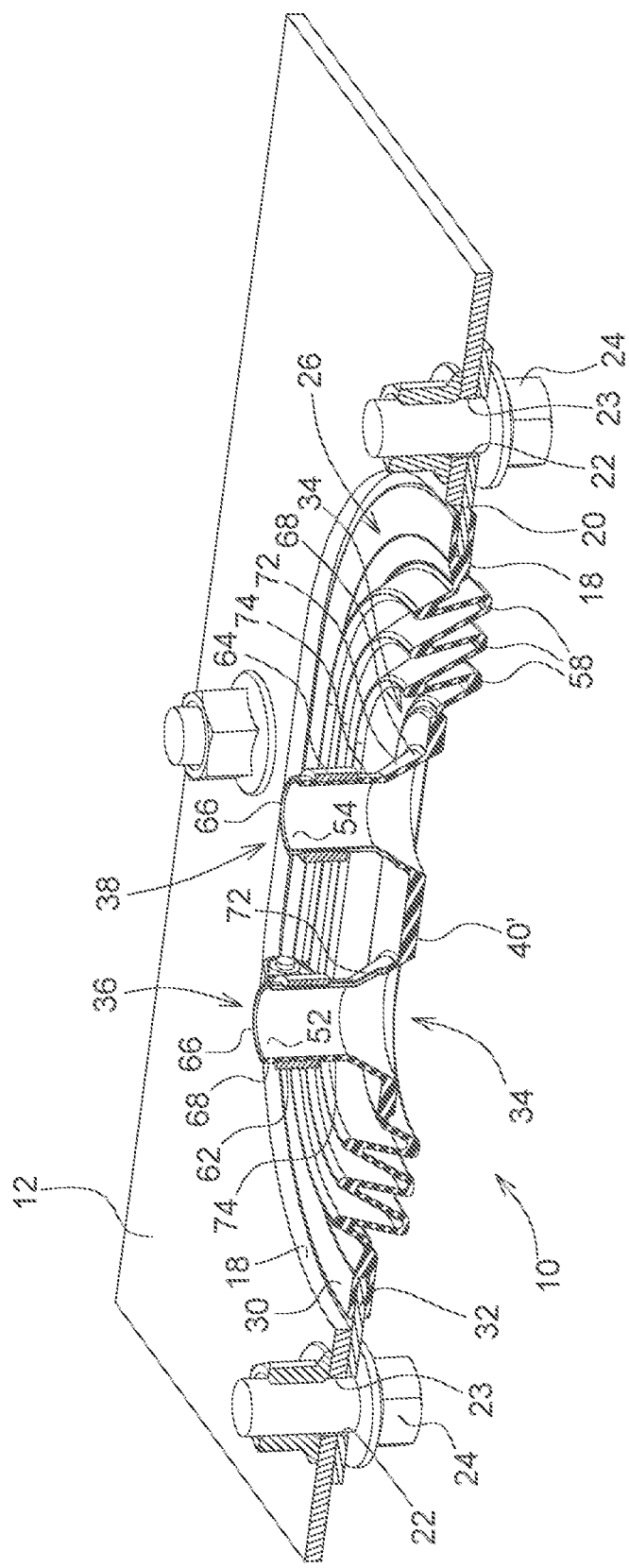
FIG. 9 is a sectional view, similar to FIG. 6, showing another embodiment of the retention mechanism without a stiffener.

Referring to FIGS. 6 and 7, the support wall 40 includes a pocket 42 and a stiffener 44 embedded in the pocket 42. The pocket 42 is overmolded onto the stiffener 44. The conduits 36, 38 extend axially from the pocket 42, and the web 26 extends radially from the pocket 42. The stiffener 44 is configured, for example, as a plate and includes a first conduit aperture 46, a second conduit aperture 48, and an attachment aperture 50. The first conduit aperture 46 is positioned in communication with a first passageway 52 of the first conduit 36. The second conduit aperture 48 is positioned in communication with a second passageway 54 of the second conduit 38. The attachment aperture 50 is filled with material of which the pocket 42 is made to facilitate attachment of the stiffener 44 to the pocket 42. Referring to FIG. 9, in other embodiments, the support wall may be configured as a simple wall 40' without a pocket 42 and a stiffener 44.

Figure 4:
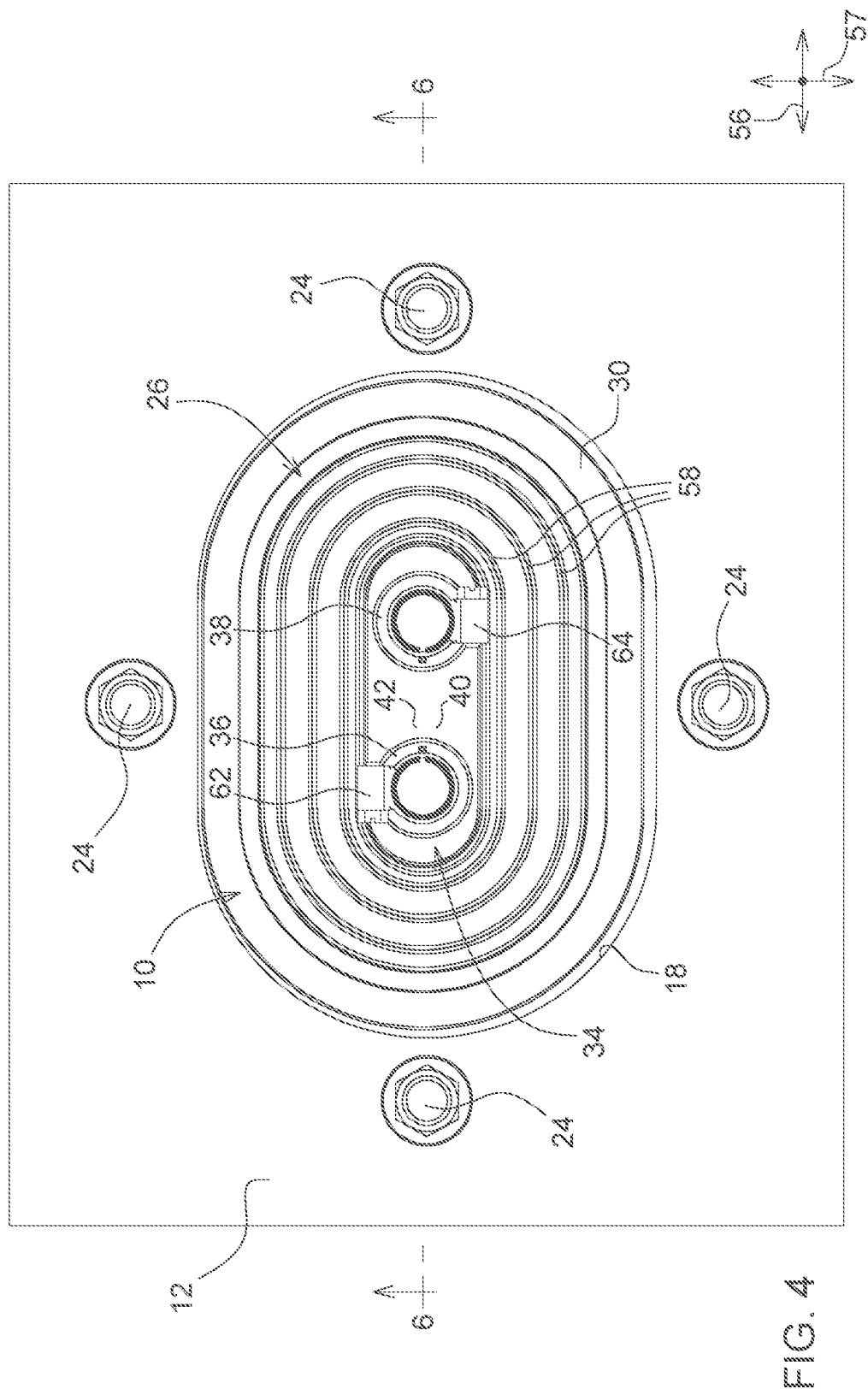
FIG. 4 is an elevational view showing a first side of the retention mechanism.
Figure 5:
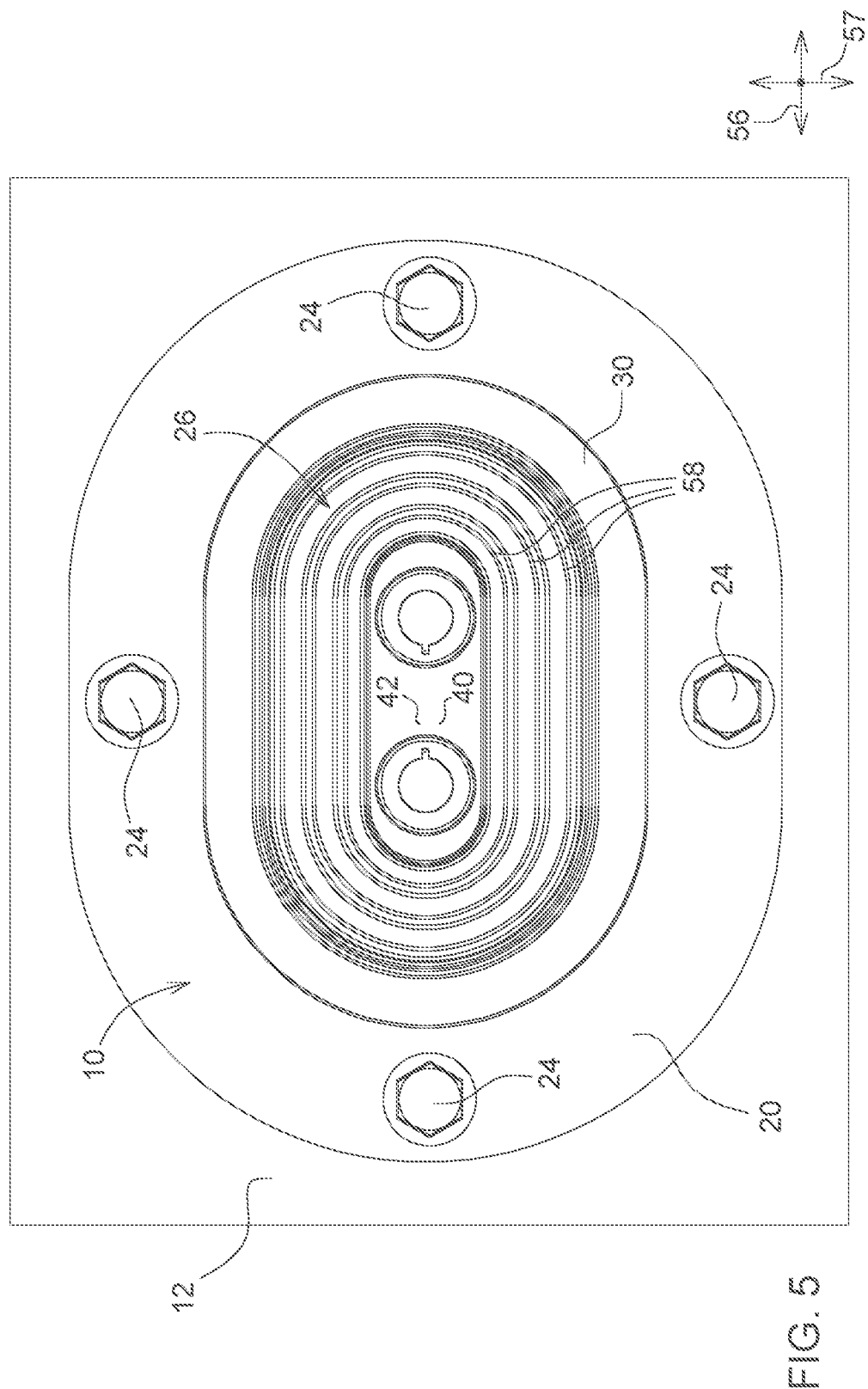
FIG. 5 is an elevational view showing a second side of the retention mechanism.

Referring to FIGS. 4-6, the web 26 surrounds the first and second conduits 36, 38. The first and second conduits 36, 38 are spaced apart from one another in a dimension 56, and the web 26 is elongated in that dimension 56 to accommodate that conduit spacing. The web 26 may thus be oblong so as to be narrower in the dimension 57. The attachment aperture 50 is positioned between the first and second conduits 36, 38 and between the first and second conduit apertures 46, 48 in the dimension 56.

The web 26 is convoluted. As such, the web 26 has one or more convolutions 58. Illustratively, the web 26 has three convolutions 58. Each convolution 58 is a closed-loop surrounding the central portion 34 and its conduits 36, 38 and support wall 40. In the neutral state of the web 26, the convolutions 58 are concentric and positioned on a common plane 60, defined by the mounting wall 20, around the first and second conduits 36, 38. The convolutions 58 lean radially to facilitate the telescopic nature of the web 26. Illustratively, the convolutions 58 lean radially inwardly toward the first and second conduits 36, 38. In other embodiments, the convolutions 58 may lean radially outwardly.

Illustratively, the web 26 and the first and second conduits 36, 38 are integrated into a single part 62. The pocket 42 is included in the part 62. In embodiments where the support wall 40 is a simple wall, the support wall 40 may be included in the part 62. The part 62 is made, for example, of an elastomeric material. In some embodiments, one or more of the web 26, the conduits 36, 38, the pocket 42, and the support wall 40 may be separate parts.

Figure 2:
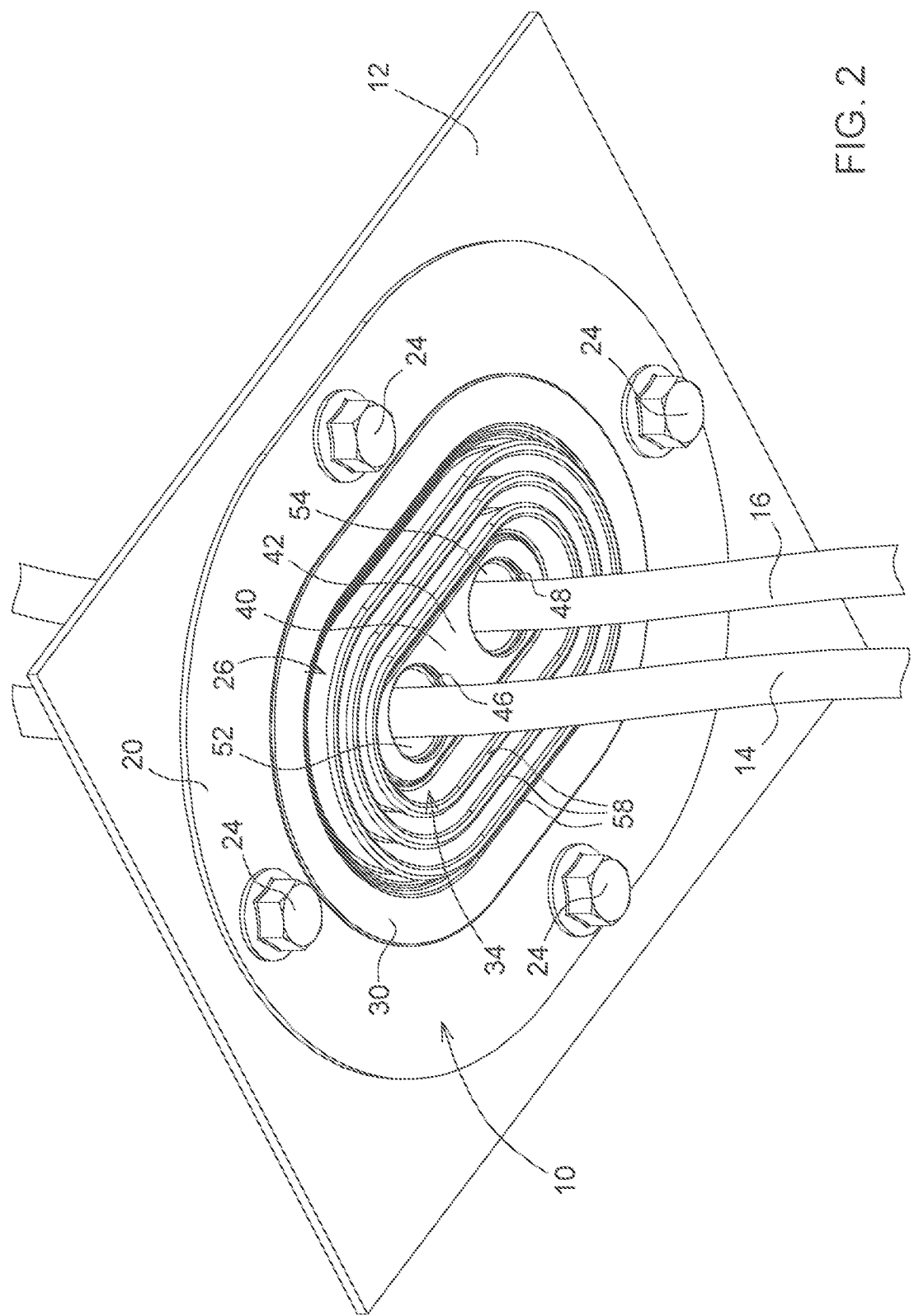
FIG. 2 is a perspective view showing an opposite side of the retention mechanism.
Figure 3:
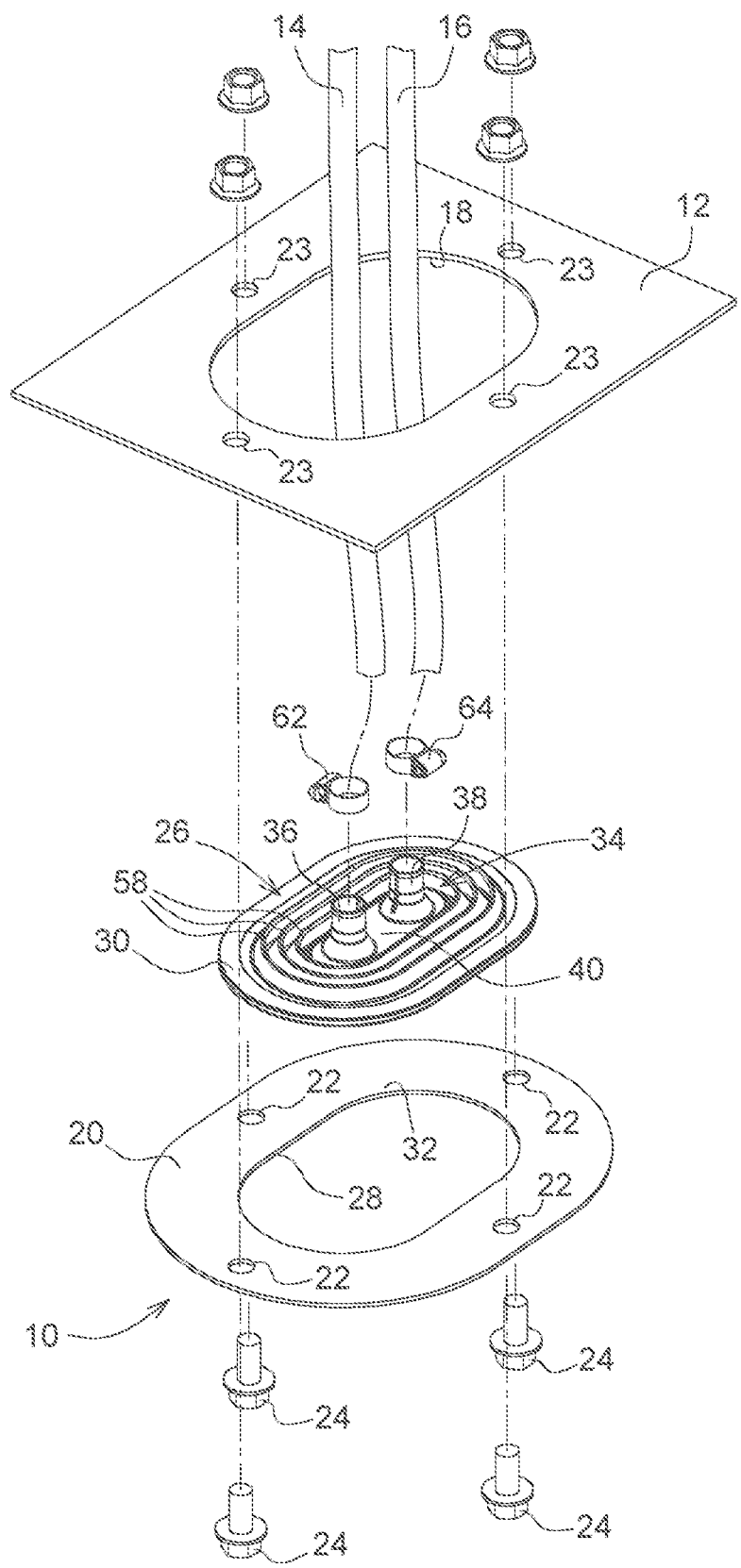
FIG. 3 is an exploded perspective view showing the retention mechanism.

Referring to FIGS. 1 and 2, the first and second lines 14, 16 extend respectively through the first and second conduits 36, 38. The first conduit 36 defines the first passageway 52 through the web 26. The first passageway 52 receives the first line 14 through the first passageway 52 and the web 26. The first conduit 36 is fixed to the first line 14 to block passage of contaminants through the first passageway 52 between the first conduit 36 and the first line 14. The second conduit 38 defines the second passageway 54 through the web 26. The second passageway 54 receives the second line 16 through the second passageway 54 and the web 26. The second conduit 38 is fixed to the second line 16 to block passage of contaminants through the second passageway 54 between the second conduit 38 and the second line 16. The first and second conduits 36, 38 are attached to and surrounded by the web 26 such that the web 26 enables movement of the first and second lines 14, 16 relative to the support structure 12.

The retention mechanism 10 includes a first clamp 62 and a second clamp 64. The first clamp 62 clamps the first conduit 36 and the first line 14 to one another. The second clamp 64 clamps the second conduit 38 and the second line 16 to one another. Each of the clamps 62, 64 may be, for example, a band clamp (the slits in the band of the band clamp are omitted for ease of illustration).

Figure 8:
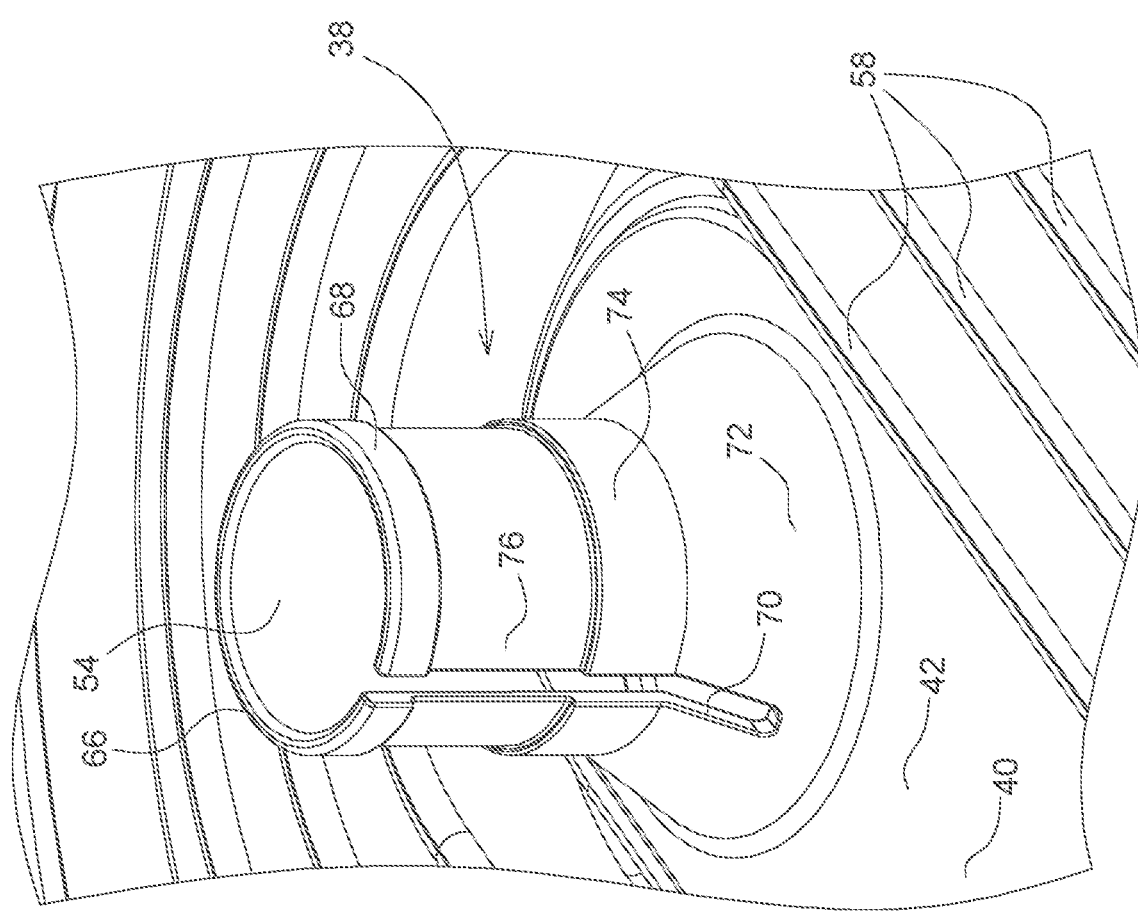
FIG. 8 is a perspective view, with portions broken away, showing a conduit of the retention mechanism with a slit.

Referring to FIG. 8, each of the conduits 36, 38 includes a distal end 66 relative to the support wall 40, a side wall 68 extending from the support wall 40 to the distal end 66, and a slit 70 formed in the side wall 68 and extending lengthwise of the side wall 68 to the distal end 66. The slit 70 is configured to decrease in width to facilite clamping of the conduit 36, 38 to the respective line 14, 16.

The side wall 68 of each conduit 36, 38 comprises a frusto-conical portion 72 and a cylindrical portion 74. The frusto-conical portion necks down from the support wall 40. The cylindrical portion 74 extends from the frusto-conical portion 72 away from the support wall 40 to the distal end 66. The slit 70 extends from the distal end 66 through the cylindrical portion 74 into the frusto-conical portion 72. Each clamp 62, 64 is positioned in a groove 76 of the cylindrical portion 74 of the respective conduit 36, 38 so as to contact the groove 76 therein. The slit 70 and frusto-conical portion 72 enable the respective conduit 36, 38 to adapt to a wide range of lines with various diameters without the need to retool the part 62 for a more specifically tailored fit for each line, offering some forgiveness in the design for fit of the line in the respective conduit 36, 38. Instead of having the diameter of the cylindrical portion 74 define the maximum outside diameter of the line that may be supported in and pass through the respective conduit 36, 38, the maximum outside diameter is instead defined by the base diameter of the frusto-conical portion 72. The slit 70 and frusto-conical portion 72 functionally serve as a hinge enabling the cylindrical portion 74 to open wider to allow larger components to pass through and be supported. In an application where the line is a hose, the hose end connector could be two or more times the diameter of the hose material itself. In such a case, the slit 70 and frusto-conical portion 72 enable expansion of the conduit 36, 38 for passage of the hose end connector therethrough and subsequent contraction for clamping of the conduit 36, 38 onto the hose.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A retention mechanism for use with a first line and a second line, comprising:
   a flexible convoluted web to be mounted to a support structure,
   a first conduit defining a first passageway through the web, the first passageway configured to receive the first line through the first passageway, the first conduit configured to be fixed to the first line to block passage of contaminants through the first passageway, and
   a second conduit defining a second passageway through the web, the second passageway configured to receive the second line through the second passageway, the second conduit configured to be fixed to the second line to block passage of contaminants through the second passageway, the first and second conduits attached to and surrounded by the web such that the web enables movement of the first and second lines relative to the support structure when the first and second lines are fixed respectively to the first and second conduits and extend respectively through the first and second passageways,
   wherein the web comprises concentric convolutions, the convolutions are positioned on a common plane, and each of the convolutions surrounds both of the first and second conduits, and
   wherein each convolution includes a cross-section comprising a first ridge formed on a first side of the common plane and a second ridge formed on a second side of the common plane opposite the first side.

2. The retention mechanism of claim 1, wherein the convolutions lean radially to facilitate a telescopic nature of the web.

3. The retention mechanism of claim 2, wherein the convolutions lean radially toward the first and second conduits.

4. The retention mechanism of claim 1, wherein the convolutions have a common shape in cross-section.

5. The retention mechanism of claim 1, comprising a support wall, wherein each of the first conduit and the second conduit is attached to the support wall.

6. The retention mechanism of claim 5, wherein the web extends radially from the support wall toward the support structure.

7. The retention mechanism of claim 5, wherein each of the convolutions is a closed-loop surrounding the first and second conduits and support wall.

8. The retention mechanism of claim 7, wherein only one of the convolutions surrounds and engages with the support structure.

9. A retention mechanism for use with a first line and a second line, comprising:
- a flexible convoluted web to be mounted to a support structure,
- a first conduit defining a first passageway through the web, the first passageway configured to receive the first line through the first passageway, the first conduit configured to be fixed to the first line to block passage of contaminants through the first passageway, and
- a second conduit defining a second passageway through the web, the second passageway configured to receive the second line through the second passageway, the second conduit configured to be fixed to the second line to block passage of contaminants through the second passageway, the first and second conduits attached to and surrounded by the web such that the web enables movement of the first and second lines relative to the support structure when the first and second lines are fixed respectively to the first and second conduits and extend respectively through the first and second passageways, wherein the web comprises at least one convolution, and the convolution is positioned on a common plane and surrounds both of the first and second conduits, and wherein the convolution includes a cross-section comprising a first ridge formed on a first side of the common plane and a second ridge formed on a second side of the common plane opposite the first side.

10. The retention mechanism of claim 9, wherein the convolution leans radially to facilitate a telescopic nature of the web.

11. The retention mechanism of claim 10, wherein the convolution leans radially toward the first and second conduits.

12. The retention mechanism of claim 9, comprising a support wall, wherein each of the first conduit and the second conduit is attached to the support wall.

13. The retention mechanism of claim 12, wherein the web extends radially from the support wall toward the support structure.

14. The retention mechanism of claim 12, wherein the convolution is a closed-loop surrounding the first and second conduits and support wall.

* * * * *